UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

COMPOSITION OF MATTER AND METHOD FOR PRODUCING THE SAME.

1,342,084.      Specification of Letters Patent.      Patented June 1, 1920.

No Drawing.      Application filed September 4, 1919. Serial No. 321,688.

*To all whom it may concern:*

Be it known that I, LOUIS E. BARTON, a citizen of the United States, and a resident of Niagara Falls, in the county of Niagara, State of New York, have invented a new and useful Composition of Matter and Method for Producing the Same, of which the following is a specification.

My present invention relates to the obtaining from materials containing the oxid of zirconium, such particularly, for example, as the ores known as baddeleyite and zircon (zirconium silicate) a product, composition, or chemical compound, containing by analysis zirconium in preponderance, also nitrogen, and also carbon in less quantity than the nitrogen, and which product, fairly designatable, I believe, as a zirconium cyanonitrid, and hereinafter so designated, is, I have discovered, of utility in certain arts and for several purposes,—such for example as obtainment therefrom of zirconium oxid concentrates by aid of another of my inventions for which I am about to apply for Letters Patent.

The objects of my present invention comprise the obtainment of the said zirconium cyanonitrid, and this also by aid of procedures which are industrially practicable and economical as hereinafter described.

My invention is practised and its product obtained as follows, viz: I bring the above referred to material, or ore, containing zirconium oxid into contact, as by mixing it (preferably preliminarily crushed, except zircon, to about one-half inch size, or smaller) with an oxid reducing agent, preferably a carbonaceous agent, such, for example, as coke, the respective proportions being, within limits, variable as may be indicated:—for example, when coke is employed I usually prefer a ratio of about five of ore to one of coke, *i. e.* about 20 pounds of coke to 100 pounds of such an ore as baddeleyite, or zircon.

I then charge the mixture, gradually, into an electric arc furnace, at temperature such as to decompose the oxid, *i. e.* such temperature as is, for example, obtainable under the conditions mentioned by aid of a current of about 15000 amperes at 50 volts,—the rate of charging depending somewhat, of course, upon the composition of the ore, its analysis, and the nature of its impurities, such as iron, silicon, etc. The best rate of charging is readily determined for a particular charge by a little experimentation and analysis of the resulting product.

The result, if the charging be thus gradually and properly made, will, for example when zircon has been mixed with coke, be my above referred to novel zirconium cyanonitrid product, characterizable as having a metallic luster, as being usually golden yellow to bronze in color, as usually of about 5.95 to 6.35 specific gravity, and as containing, by analysis, for example:

| | |
|---|---|
| Zirconium | 82.0 to 84.0 |
| Titanium | 1.5 to 2.5 |
| Silica | .5 to 1.5 |
| Iron | .3 to .5 |
| Carbon | 3.0 to 5.0 |
| Nitrogen | 8.0 to 10.0 |

This product differs in several respects, *e. g.* as regards the ease with which it is possible to crush, or mill, it to even as fine as 350 mesh, and also as regards its composition, as above indicated, from to me known previous carbid on nitrid products obtainable by otherwise than as above described proportioning and smelting the charge.

I continue my gradual charging and smelting until the crucible, or hearth, of the furnace is full, after which I allow the charge to cool and solidify and then remove it from the furnace.

I, usually for commercial, or manufacturing, purposes, crush this product, or melt, consisting preponderatingly of zirconium cyanonitrid, by aid of any appropriate apparatus, such as a jaw crusher, of a rolls and ball mill, or equivalent, capable of reducing it to a condition of fine comminution. The degree of fineness varies as may be indicated by the purpose for which my final zirconium cyanonitrid product is to be employed, but it is usually preferable to have it so fine as to pass through a 350 mesh screen.

Should my aforesaid zirconium cyanonitrid product, or comminuted melt, be found, owing to constituents of the particular material, or ore, treated, undesirably contaminated by impurities, or undesired substances, as, for example, iron, etc., I then treat it to a bath containing dilute sulfuric, or equivalent, acid. I use for this purpose, preferably, sulfuric acid of about 5 per cent. strength, allowing the charge to stand in the cold until the iron is dissolved. Heating the charge, during the treatment, hastens the solution of the iron, but is not essential. By this means I have, for example, succeeded in reducing a content of 1.86% metallic iron in my zirconium cyanonitrid product to 0.2%.

I next withdraw, from said bath, my residual zirconium cyanonitrid product preferably by washing with water and decanting, or, if desired, collecting the residue in filter press, or by other means.

If the product is to be stocked for future general, or specific, uses, it is necessary to, and I accordingly, dry it at not above 100° C., but such comparatively complete drying is, I find, dispensable in cases in which the product is subjected to my above referred to treatment for therefrom obtaining zirconium oxid concentrates.

As indicated by the foregoing analysis, the ores referred to are apt to contain relatively small amounts of oxid of titanium, the result in such cases being the retention in my zirconium cyanonitrid products of a corresponding modicum of titanic constituents. This, I have discovered to be, not only usually undetrimental, but for certain uses positively advantageous.

Having now described my invention, what I claim as new and desire to secure by Letters Patent is the following, viz:

1. The new composition of matter consisting, by analysis, preponderatingly of zirconium and containing also nitrogen in quantity less than zirconium and carbon in quantity less than nitrogen.

2. The new composition of matter consisting essentially of zirconium, nitrogen, and carbon chemically combined.

3. The new composition of matter containing zirconium and also nitrogen in quantity less than zirconium and therewith chemically combined, and also carbon in quantity less than said nitrogen and therewith and with the zirconium chemically combined.

4. The new composition of matter containing, by analysis, not less than fifty per cent. of zirconium not less than five per cent. of nitrogen and not less than one per cent. of carbon in chemical combination with each other.

5. The new composition of matter containing, by analysis, from 75% to 90% of zirconium, from 4% to 12% of nitrogen and from 1% to 9% carbon.

6. The new composition of matter containing, by analysis, nitrogen, carbon, zirconium in preponderance, and also not less than one-half of one per cent. of titanium.

7. The new composition of matter consisting essentially of chemical compounds of zirconium, nitrogen, carbon and titanium.

8. The method of treating material, for example ore, containing oxid of zirconium which comprises mixing such material with a carbonaceous reducing agent, and heating the mixture to decomposition of said oxid.

9. The method of treating material, for example ore, containing oxid of zirconium, which comprises mixing such material with coke, and heating the mixture to decomposition of said oxid.

10. In treating an ore, e. g. baddeleyite, or zircon, containing oxid of zirconium, the steps which consist in mixing said ore with coke in the ratio of about five of ore to one of coke, and heating the mixture to decomposition of said oxid.

11. In treating an ore, e. g. baddeleyite, or zircon, containing oxid of zirconium, the steps which consist in mixing said ore with coke in the ratio of about five of ore to one of coke, and gradually charging the mixture into a furnace at temperature such as to decompose said oxid.

12. In treating an ore, e. g. baddeleyite, or zircon, containing oxid of zirconium, the steps which consist in mixing said ore with coke in the ratio of about five of ore to one of coke, and charging the mixture gradually into an electric furnace having a current of about 15000 amperes at 50 volts.

13. The method of treating material, for example ore, containing oxid of zirconium, which comprises mixing such material with a carbonaceous reducing agent, heating the mixture to decomposition of said oxid, and treating the resulting melt to a bath containing a dilute acid.

14. The method of treating material, for example ore, containing oxid of zirconium, which comprises mixing such material with a carbonaceous reducing agent, heating the mixture to decomposition of said oxid, and treating the resulting melt to a bath containing dilute sulfuric acid.

15. The method of treating material, for example ore, containing oxid of zirconium, which comprises mixing such material with a carbonaceous reducing agent, heating the mixture to decomposition of said oxid, treating the resulting melt to a bath containing a dilute acid, withdrawing the residue from said bath and drying it at not above 100° C.

16 The new composition of matter characterized as having metallic luster, as being golden yellow to bronze in color, as being of specific gravity 5.95 to 6.35 and as consisting, by analysis, preponderatingly of zirconium, and containing also nitrogen, in quantity less than zirconium, and carbon in quantity less than nitrogen.

LOUIS E. BARTON.

Witnesses:
TOM C. GRAHAM,
CARL P. REISIG.